Aug. 24, 1954  R. L. TOFFOLON  2,687,321
CARGO BINDER
Filed March 7, 1952  6 Sheets-Sheet 2
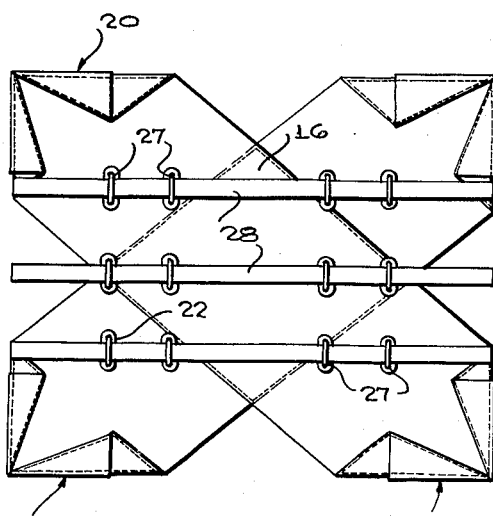
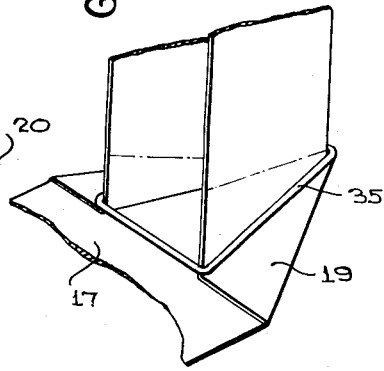
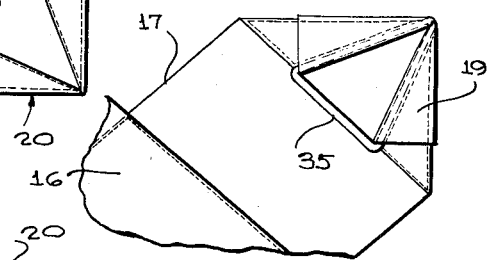
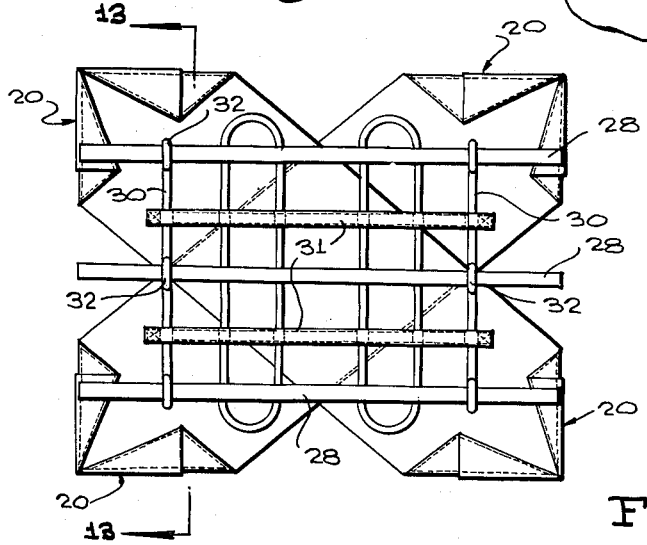
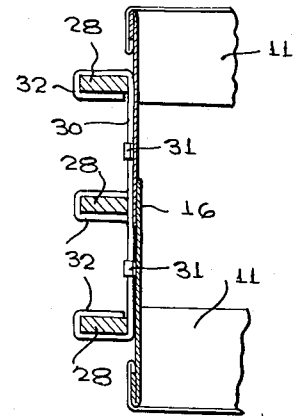
INVENTOR
ROGER L. TOFFOLON
BY
McMorrow, Berman + Davidson
ATTORNEYS Aug. 24, 1954 — R. L. TOFFOLON — 2,687,321
CARGO BINDER
Filed March 7, 1952 — 6 Sheets-Sheet 3
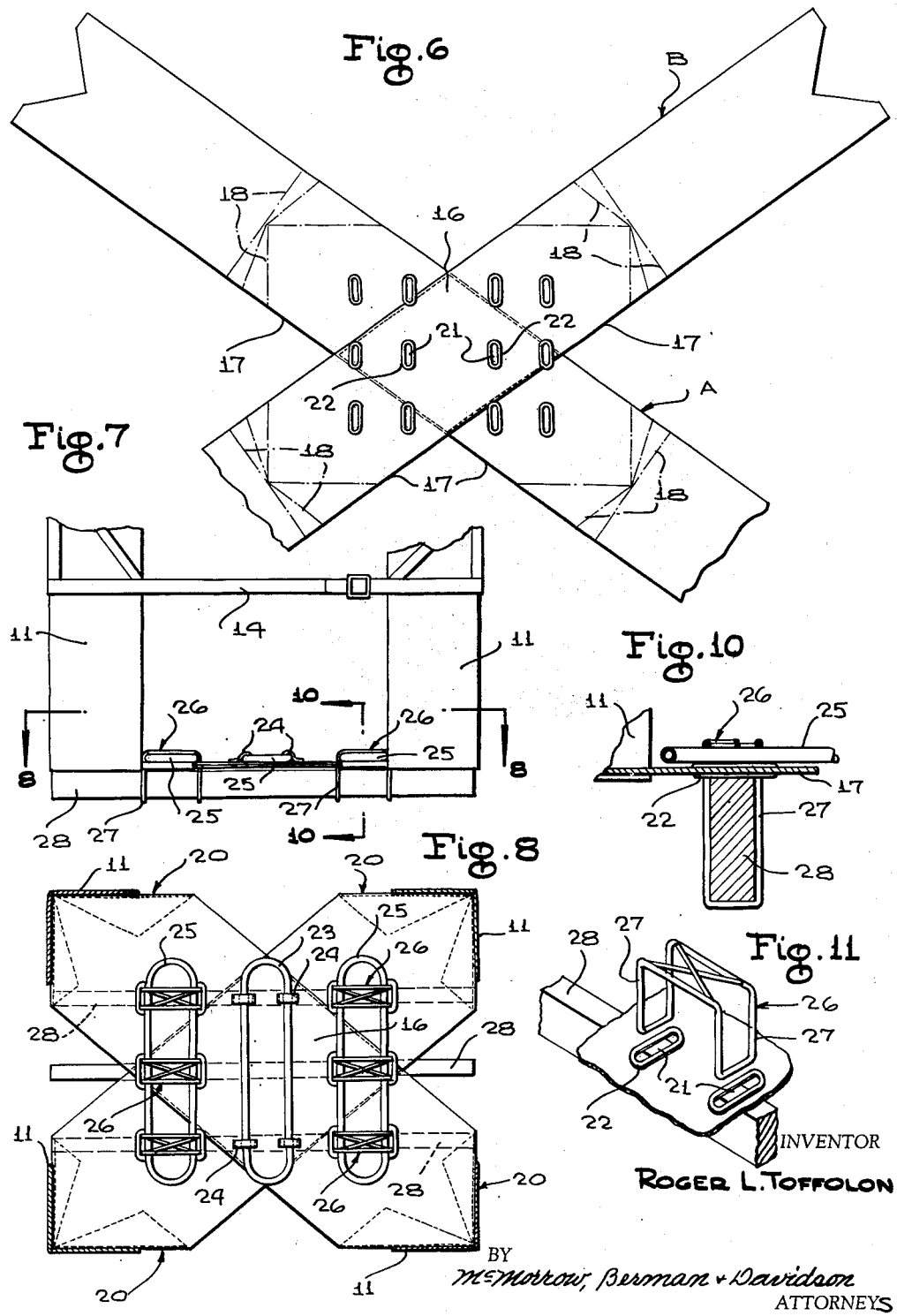
INVENTOR
ROGER L. TOFFOLON
BY McMorrow, Berman & Davidson
ATTORNEYS Aug. 24, 1954  R. L. TOFFOLON  2,687,321
CARGO BINDER Filed March 7, 1952  6 Sheets-Sheet 4

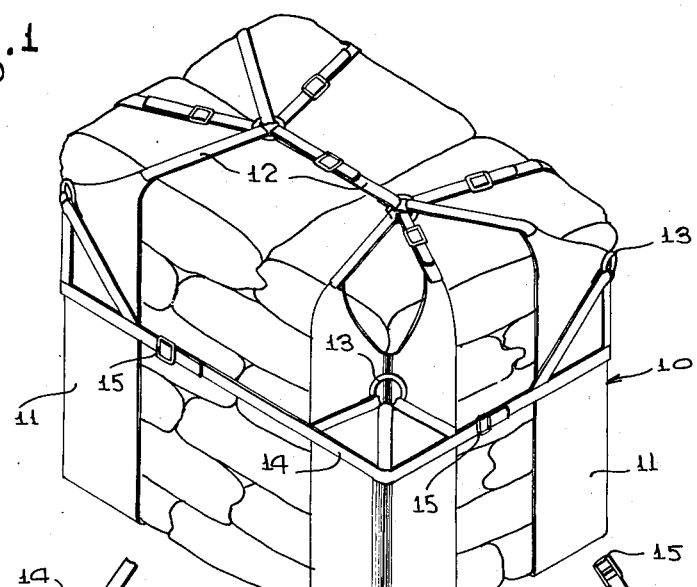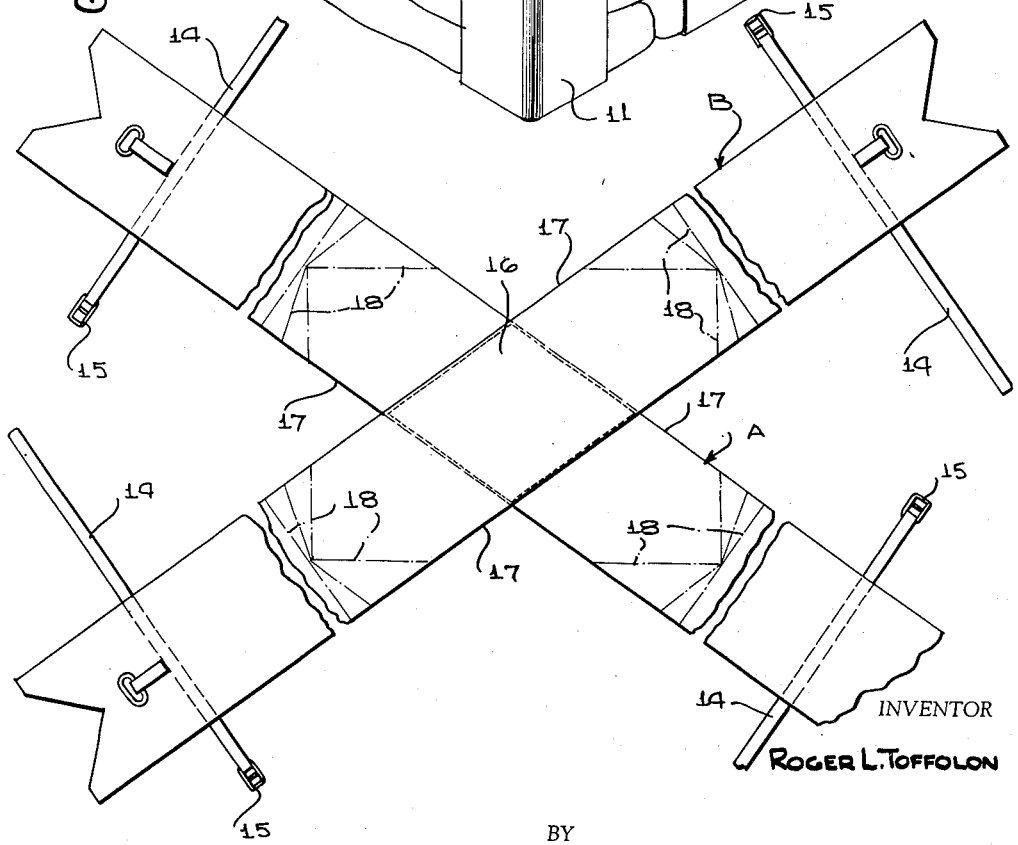

INVENTOR
ROGER L. TOFFOLON

BY
McMorrow, Berman & Davidson
ATTORNEYS

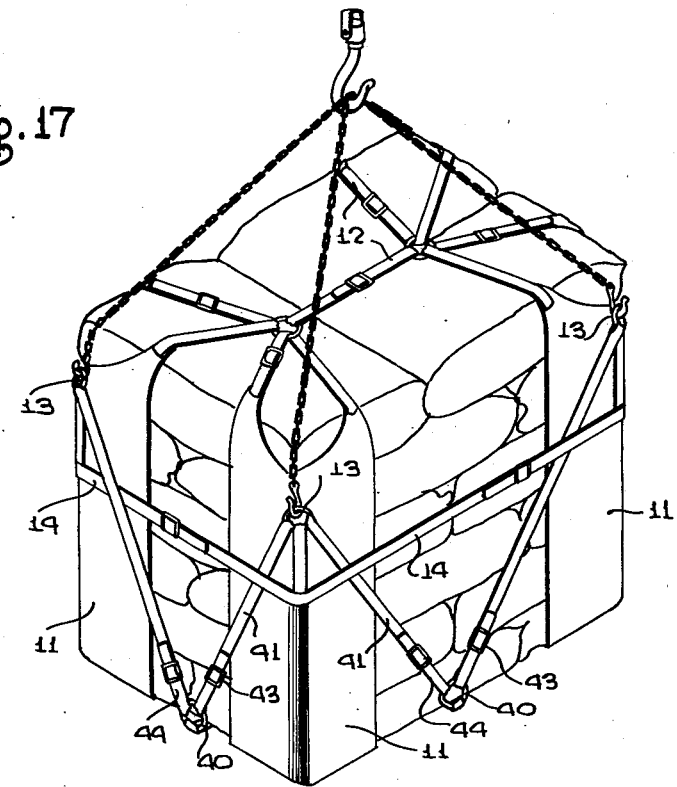
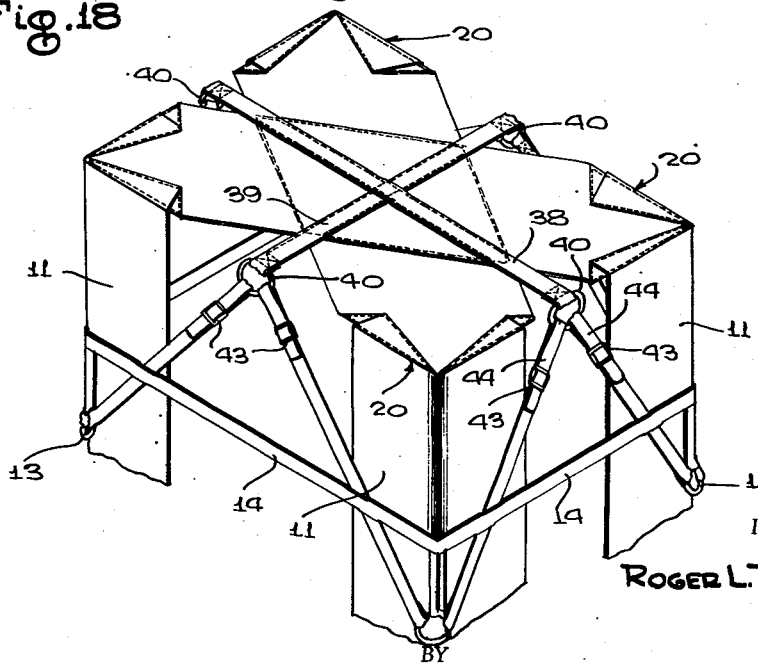

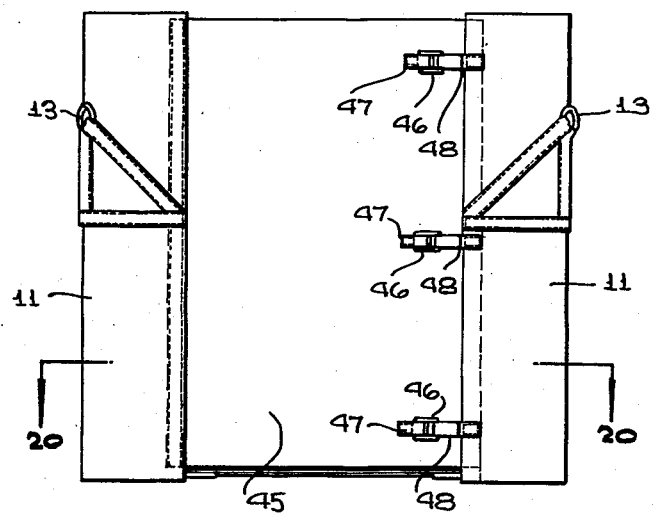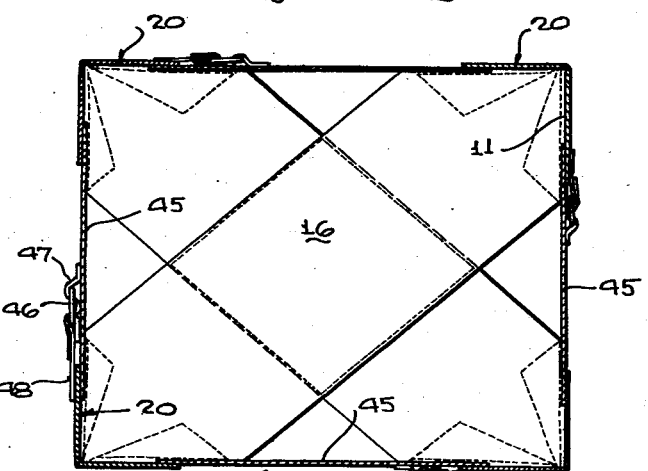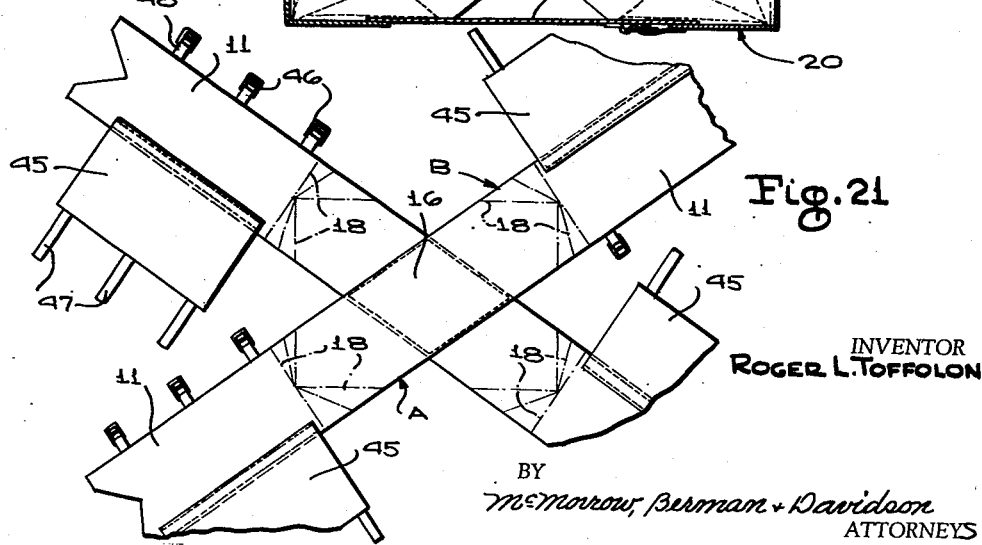

Patented Aug. 24, 1954

2,687,321

UNITED STATES PATENT OFFICE 2,687,321

CARGO BINDER

Roger Louis Toffolon, Schenectady, N. Y.

Application March 7, 1952, Serial No. 275,420

11 Claims. (Cl. 294—74)

This invention relates to binders, and more particularly to binders of the cargo carrying type.

An object of the present invention is to provide binders which are flexible and which require no pallets.

Another object of the present invention is to provide binders which are adapted for all conditions of cargo carrying use.

A further object of the present invention is to provide binders which are of sturdy construction, highly efficient in action, and commercially feasible.

Other objects and advantages will become apparent from the following description taken in conjunction with the accompanying drawings, wherein:

Figure 1 is a perspective view of a binder according to the present invention enclosing a load of bagged material.

Figure 2 is a plan view, with parts broken away, showing the two flexible webs employed in forming the binder of the present invention arranged in crisscross face to face relation and secured together in the crisscross region and forming an anchor with the web portions diverging from the anchor and each carrying a strap but with the portions of the side edges of each of the web portions contiguous to the anchor unfolded along the respective illustrated fold lines.

Figure 6 is a plan view, with parts broken away, of the assembly of Figure 2, but showing the anchor and the portions of the web portions adjacent such anchor provided with a plurality of openings, each provided with a grommet, arranged in parallel laterally spaced rows.

Figure 7 is a fragmentary side elevation of the binder of Figure 1 having a modified base provided with laterally spaced rows of grommet containing openings, with a flat rigid supporting frame extending longitudinally of adjacent rows and supported upon the upper face of the base and having loops projecting through the openings of the rows, and a rigid backing and supporting element extending through aligned loops of the respective rows.

Figure 8 is a sectional view taken on the line 8—8 of Figure 7.

Figure 9 is a bottom plan view of the assembly of Figure 7.

Figure 10 is a sectional view taken on the line 10—10 of Figure 7.

Figure 11 is an exploded perspective view of a single loop frame employed in the assembly of Figures 7 and 8 and which extends through the grommet openings of adjacent rows, with the rigid supporting frame omitted.

Figure 12 is a bottom plan view of the assembly of Figure 7, having a further modified base provided with two laterally spaced rows of loops projecting from the under surface thereof, rigid backing and supporting elements extending through aligned loops of the respective rows, and rigid backing frames abutting the under surface of the base and extending longitudinally of and between the rows.

Figure 13 is a sectional view taken on the line 13—13 of Figure 12.

Figure 14 is a fragmentary enlarged view of one of the diverging web portions with the portions of its side edges folded partially back upon one face thereof and having a rigid flat reinforcing frame mounted upon the folded back portions.

Figure 15 is a fragmentary view of the same assembly of Figure 14 but showing the folded back portions secured to the one face with the reinforcing frame fixedly held by said portions.

Figure 16:
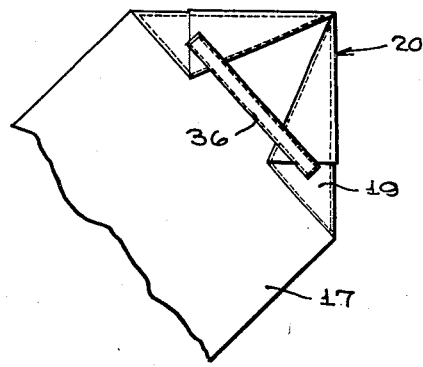

Figure 16 is a fragmentary view of the same assembly of Figure 15 but with a flexible reinforcing strip bridging the folded back portions and secured to said portions.

Figure 17 is a perspective view of a modified form of the binder according to the present invention.

Figure 18 is a fragmentary perspective view of the bottom portion of the binder of Figure 17.

Figure 19 is a side elevational view of the binder of Figure 1 but with a flexible flap interposed between and connected to adjacent legs.

Figure 20 is a sectional view taken along the line 20—20 of Figure 19.

Figure 21 is a plan view, with parts broken away, of the assembly of Figure 2 but showing the flexible flaps carried by each of the web portions beyond the illustrated fold lines.

Figure 22:
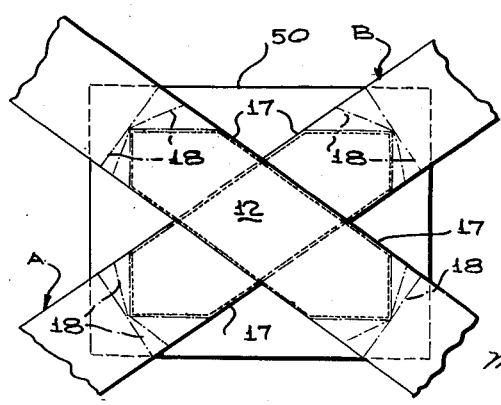

Figure 22 is a plan view, upon a reduced scale, with parts broken away, of the assembly of Figure 2 but showing the border flexible sheet underlying the anchor and the portions of the diverging web portions which when folded form the corners and which together with the anchor form the base of the binder of the present invention.

Referring to Figure 1 of the drawings, such figure shows a binder of the present invention enclosing a load of bagged material, the binder embodying a plurality of legs 11 projecting upwardly from the base. The free ends of the legs are secured together by flexible means or straps 12 which extend between and are connected to such free ends. Arranged on the exterior surface of each of the legs adjacent the free end thereof and secured thereto is a ring 13 for the reception of a lifting hook. Other flexible means secures the legs 11 together inwardly of the free ends thereof, such means embodying a strap 14 carried by each leg inwardly of the free end, one end of the strap having a buckle 15 which receives and engages the other end portion of the strap on the adjacent leg.

Figure 3:
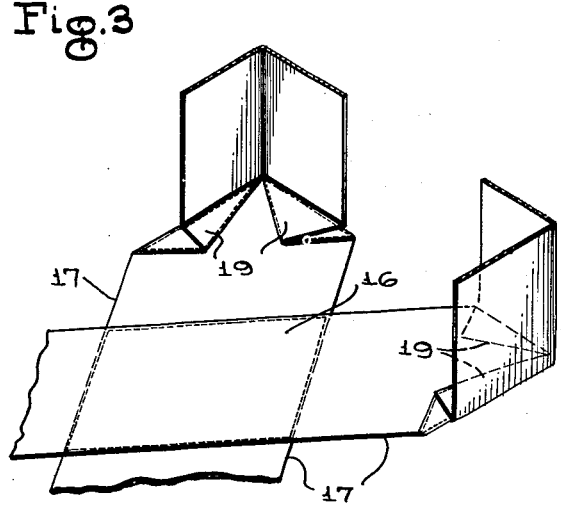
Figure 3 is a fragmentary perspective view of the assembly of Figure 2 showing only two of the diverging web portions with the portions of the side edges of such web portions folded back upon and secured to one face thereof with the parts beyond the secured folded back portions projecting from the one face.
Figure 4:
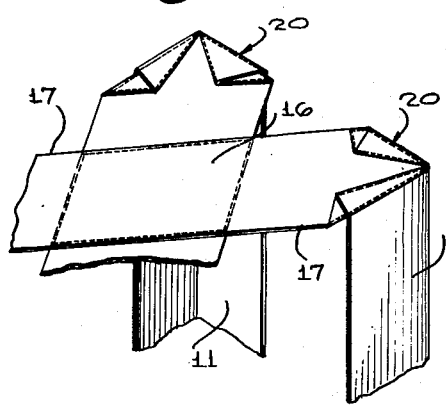
Figure 4 is a fragmentary perspective view of the assembly of Figure 3 but showing the parts of the two diverging web portions beyond the secured folded back portions turned toward the opposite faces thereof and thereby forming corners each having a leg projecting therefrom.
Figure 5:
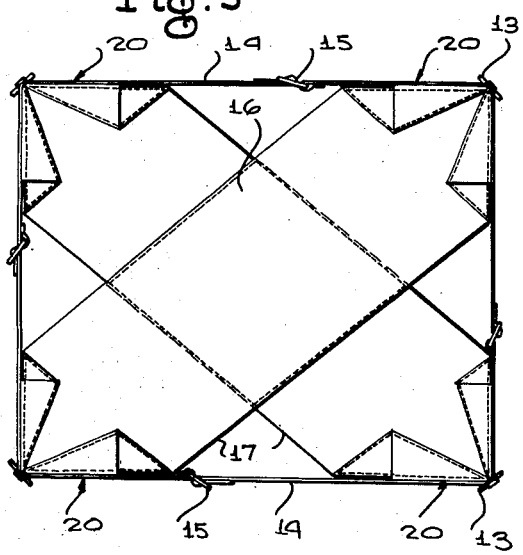
Figure 5 is a bottom plan view of Figure 1 showing the arrangement of the anchor and the four corners and which together form the base of the binder according to the present invention.

The binder of the present invention is fabricated from flexible material, such as heavy paper, cloth or heavy canvas, and comprises, Figure 2, at least two flexible webs A and B arranged in crisscross face to face relation and secured together in the crisscross region to thereby form an anchor 16 having a plurality of web portions 17 diverging therefrom. Each web portion 17 contiguous to the anchor 16 has portions of its side edges represented by the group of crease lines 18, Figure 2, folded back upon and secured to one face thereof as indicated by the numeral 19, Figure 3, with the part beyond the folded back portion 19 then turned toward the opposite face thereof, Figure 4, to thereby form a corner 20 having a leg 11 projecting from said corner. The corners 20 and anchor 16, Figure 5, together form the base of the binder as shown in Figure 1.

For some conditions of use it is desirable and advantageous to have the base of the binder provided with means for receiving rigid backing and supporting elements such as wood boards of the desired dimensions. Specifically, such means comprises a plurality of rigid loops arranged in parallel laterally spaced rows projecting from the under surface of the base and connected to the base, the loops of each row being in alignment with the loops in the other rows and adapted to receive a rigid backing and supporting element. One form of this means consists in providing, Figure 6, the anchor 16 and the portions of the web portions 17 intermediate the group of crease lines 18 and the anchor 16 with a plurality of openings 21 arranged in parallel laterally spaced rows, the openings of each row being in alignment with the openings in the other rows, with each opening provided with a grommet 22. A flat rigid backing frame 23, in the form of an elongated wire loop, Figures 7 and 8, is arranged to abut the upper face of the base and to extend longitudinally of and between at least two adjacent rows of the opening 21, specifically between the second and third rows, and is secured to the base by the flexible strips 24. Positioned upon and abutting the upper face of the base and extending longitudinally of and between the first and second rows of openings 21 and between the third and fourth rows of openings 21 are further rigid backing frames 25 of the same structure and form of frame 23. A U-shaped wire frame 26, Figure 11, having its legs in the form of loops 27 extends between and in registry with the respective aligned openings of the first and second rows and of the third and fourth rows of openings, and has its loops 27 projecting through such openings with its bight resting upon a portion of the adjacent frame 25. The aligned loops 27 of the first, second, third and fourth rows of openings 21 each receive a rigid backing and supporting element 28, such as a wood board of two by four inch cross section.

Another form that the means provided in the base of the binder for receiving rigid backing and supporting elements may take consists of, Figures 12 and 13, in positioning at least two rigid members 30 in parallel laterally spaced relation along the under face of the base of the binder and securing same to the under face of the binder base by means of spaced flexible tapes 31 extending transversely therebetween. Each of the members 30 has a plurality of loops 32 projecting therefrom, the loops of the one member being in alignment with the loops of the other member and receiving the rigid backing and supporting elements 28 of the type and dimensions previously described. At least two flat rigid backing frames 23 of the structure and configuration hereinabove described are arranged to abut the under face of the base and to extend in longitudinal spaced relation of and between the members 30 and are secured to the base of the binder by the tapes 31.

If desired, the folded back portions 19 may be reinforced, and such reinforcement can be effected by, Figure 14, slipping a rigid flat reinforcing frame 35 over the folded back portions 19 of each web portion 17 prior to their securement to the adjacent one face, and then securing the folded back portions 19 to such web portion in such manner that the frame 35 is fixedly held by the latter portions as shown in Figure 15. In place of the reinforcement of the folded back portions 19 of each web portion 17 by the frame 35, the folded back portions 19 may be reinforced by bridging the folded back portions 19 with a flexible reinforcing strip 36 and securing such strip to the folded back portions as shown in Figure 16.

The binder, Figures 17 and 18, may be reinforced by the addition of a flexible means other than the flexible means 12 and the flexible means embodying the straps 14, such means comprising a pair of straps 38 and 39 arranged at right angles with respect to each other and secured to the under face of the anchor 16 of the binder base, the free ends of the straps 38 and 39 being located between adjacent corners 20 of the base, and each free end carrying a ring 40. Each ring 13 carries a pair of straps 41 and each of such straps has a buckle 43 on the free end thereof which receives and engages the end portion of the adjacent one of a pair of straps 44 carried by the adjacent ring 40.

In place of the legs 11 being connected together intermediate their ends by the other flexible means embodying straps 14, the adjacent legs may be connected, Figure 19, by a flexible flap 45 interposed between adjacent legs 11, the flap 45 having one side edge secured to the one leg 11 and having the other free side edge connected to the other leg 11 by means of a plurality of straps 47 carried by and projecting from such flap which are received and engaged by the buckles 46 of complemental straps 48 carried by the other leg 11.

For some purposes, it is desirable to have the base of the binder provided with means to enable the loaded binder to be bodily pulled or dragged along a supporting surface. Such means takes the form of a flexible sheet 50, Figure 22, which underlies and is secured to the base. The sheet 50 is preferably of greater dimensions than the base so as to provide border portions of a size such as to readily accommodate a grasping element.

Having fully described the invention, what I claim is new and desire to secure by Letters Patent is:

1. In a binder, at least two flexible webs arranged in crisscross face to face relation and secured together in the crosscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, said corners and anchor together forming a base of a binder, flexible means extending between and conecting the free ends of said legs together, and other flexible means extending between and connecting said legs together inwardly of the free ends thereof.

2. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, a rigid flat reinforcing frame extending between the folded back portions of each web portion and fixedly held by the latter portions, flexible means extending between and connecting the free ends of said legs together, and other flexible means extending between and connecting said legs together inwardly of the free ends thereof.

3. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, a flexible reinforcing strip bridging the folded back portions of each web portion and secured to said folded back portions, flexible means extending between and connecting the free ends of said legs together, and other flexible means extending between and connecting said legs together inwardly of the free ends thereof.

4. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, said corners and anchor together forming a base of a binder, a plurality of rigid loops are ranged in parallel laterally spaced rows projecting from the under surface of said base and connected to said base, the loops of each row being in alignment with the loops in the other rows and adapted to receive a rigid backing and supporting element, flexible means extending between and connecting the free ends of said legs together, and other flexible means extending between and connecting said legs together inwardly of the free ends thereof.

5. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, said corners and anchor together forming a base of a binder, a plurality of rigid loops arranged in parallel laterally spaced rows projecting from the under surface of said base and connected to said base, a flat rigid backing frame abutting said base and extending longitudinally of and between at least two adjacent rows of loops and secured to said base, the loops of each row being in alignment with the loops in the other rows and adapted to receive a rigid backing and supporting element, flexible means extending between and connecting the free ends of said legs together, and other flexible means extending between and connecting said legs together inwardly of the free ends thereof.

6. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, said corners and anchor together forming a base of a binder, the base being provided with a plurality of openings arranged in parallel laterally spaced rows, a flat rigid supporting frame extending longitudinally of adjacent rows and connected to said base and having loops in registry with and projecting through the openings of the respective rows, the loops of each row being in alignment with the loops in the other rows and adapted to receive a rigid backing and supporting element, flexible means extending between and connecting the free ends of said legs together, and other flexible means extending between and connecting said legs together inwardly of the free ends thereof.

7. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, said corners and anchor together forming a base of a binder, a flexible sheet underlying and secured to said base and being of greater dimensions than said base to provide border portions of a size such as to readily accommodate a grasping element, flexible means extending between and connecting the free ends of said legs together, and other flexible means extending between and connecting said legs together inwardly of the free ends thereof.

8. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to form a corner having a leg projecting from said corner, a reinforcing means extending between the folded back portions of each web portion and fixedly held by the latter portions, a plurality of rigid loops arranged in parallel laterally spaced rows projecting from the under surface of said base and connected to said base, the loops of each row being in alignment with the loops in the other rows and adapted to receive a rigid backing and supporting element, flexible means extending between and connecting the free ends of said legs together, and other flexible means extending between and connecting said legs together inwardly of the free ends thereof.

9. In a binder, at least two flexible webs arranged in crisscross face to face relation and secured together in the crosscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, said corners and anchor together forming a base of a binder, flexible means extending between and connecting the free ends of said legs together, a flexible flap interposed between adjacent legs and connected along one side to one of the adjacent legs, and a flexible strap connected to the other side of said flap and detachably securable to a securing element carried by the other of the adjacent legs.

10. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, said corners and anchor together forming a base of a binder, flexible means extending between and connecting the free ends of said legs together, other flexible means extending between and connecting said legs together inwardly of the free ends thereof, and reinforcing strap means extending exteriorly of and between said legs inwardly of the free ends thereof and connected to said legs and said base.

11. In a binder, at least two flexible webs arranged in crisscross face to face relation and secured together in the crisscross region to thereby form an anchor having a plurality of web portions diverging therefrom, each web portion having portions of its side edges contiguous to said anchor folded back upon and secured to one face thereof with the part beyond the folded back portions turned toward the opposite face thereof to thereby form a corner having a leg projecting from said corner, reinforcing means secured to the folded back portions of each web portion, flexible means extending between and connecting the free ends of said legs together, and other flexible means extending between and connecting said legs together inwardly of the free ends thereof.

References Cited in the file of this patent

UNITED STATES PATENTS

| Number | Name | Date |
|---|---|---|
| 1,397,016 | Post | Nov. 15, 1921 |
| 2,378,606 | Watson | June 19, 1945 |